April 8, 1958 P. J. FRANKLIN 2,829,426
METHOD OF MOLDING
Filed Oct. 31, 1956 2 Sheets-Sheet 1
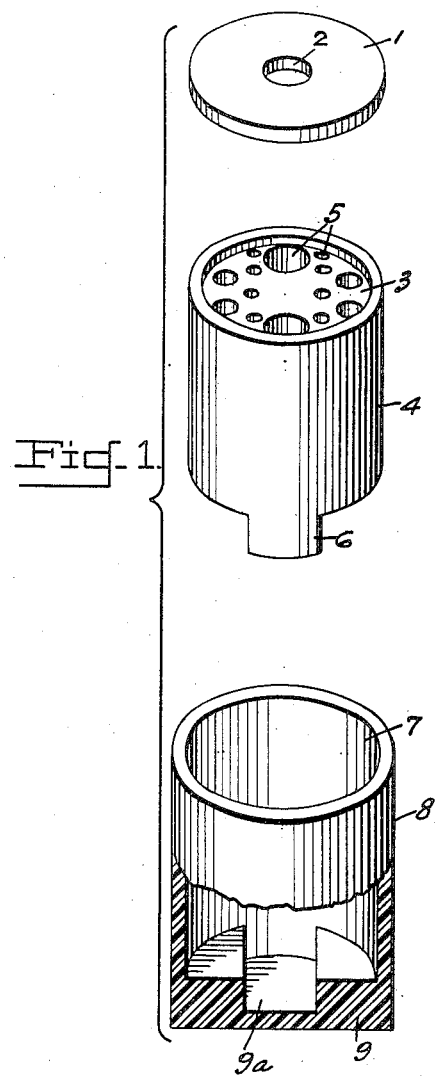
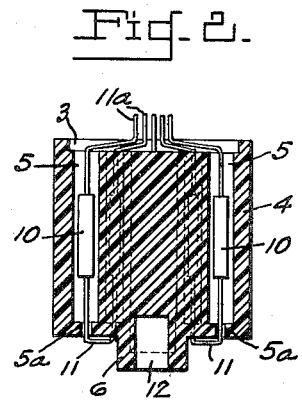
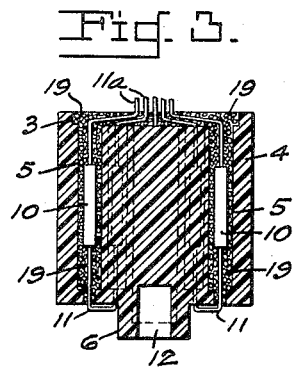
INVENTOR.
PHILIP J. FRANKLIN April 8, 1958 P. J. FRANKLIN 2,829,426
METHOD OF MOLDING
Filed Oct. 31, 1956 2 Sheets-Sheet 2
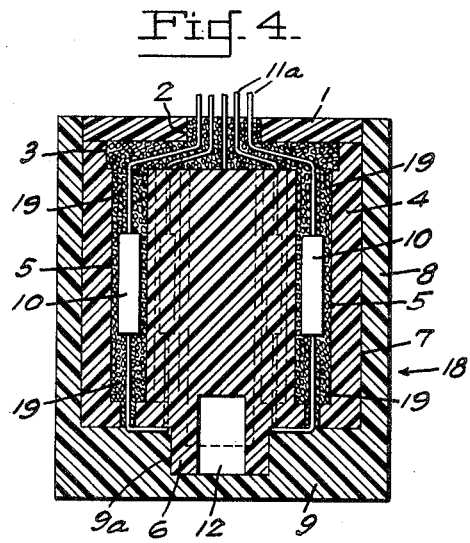
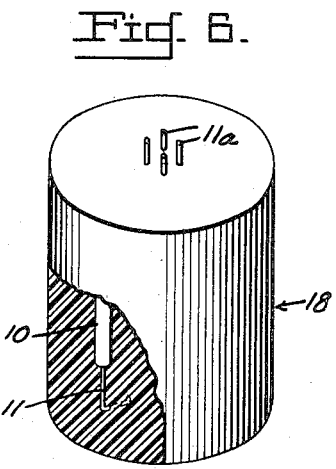
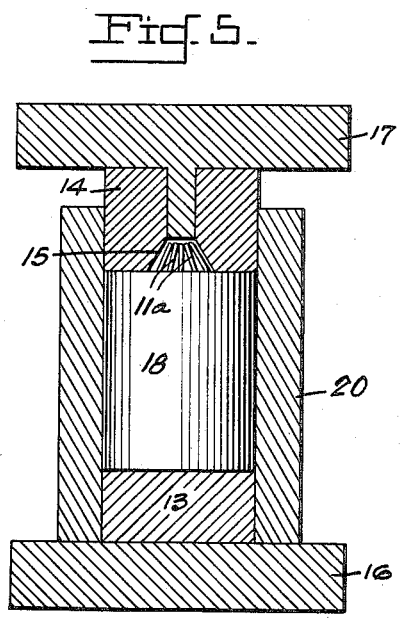
INVENTOR.
PHILIP J. FRANKLIN 2,829,426

METHOD OF MOLDING

Philip J. Franklin, Washington, D. C., assignor to the United States of America as represented by the Secretary of the Army Application October 31, 1956, Serial No. 619,357

1 Claim. (Cl. 29—155.5)

(Granted under Title 35, U. S. Code (1952), sec. 266)

The invention described herein may be manufactured and used by or for the Government for governmental purposes without the payment to me of any royalty thereon.

This invention relates to a method of molding components and subassemblies for high frequency electronic apparatus, hearing aids, portable radio transmitters and receivers and numerous subminiature electronic control devices.

In the manufacture of miniature electronic equipment it is frequently desirable to pot, mold or cast the wired components in a block of plastic material for the purpose of protecting the circuitry against the effect of external humidity, mechanical shock and the like. The usual potting, casting or molding techniques present certain difficulties involving differing coefficients of expansion between various components, damage to certain of the components due to the enblocing material, and exposure to the heat of curing, resulting in deterioration of certain components.

The specific nature of the invention as well as other objects and advantages thereof will clearly appear from the following description and accompanying drawings in which:

Figure 1 is an exploded view of the prefabricated components of a preferred assembly in accordance with the invention.

Figure 2 is a vertical cross sectional view of one of the components of Figure 1 with certain electrical components positioned therein.

Figure 3 is a view similar to that of Figure 2, showing the addition of packing material.

Figure 4 is a vertical cross sectional view of the assembly prior to processing.

Figure 5 shows the assembly of Figure 4 in a molding press.

Figure 6 is a perspective of the finished assembly, partially in section.

Referring to Figure 1 wherein 1 indicates a plastic cover plate provided with perforation 2 to accommodate leads from the components to be enbloced. The cover plate 1 is dimensioned to provide an end closure for the recessed end 3 of the main plastic cylindrical member 4 and to fit inside the plastic cup 8. The member 4 is formed with a plurality of spaced longitudinal cavities 5 extending inwardly of the recess 3. The positions and dimensions of the cavities are determined by components of circuitry such as electron tubes, resistors, capacitors, inductors, etc, A tongue 6 is formed on the end opposite the recessed end of member 4 for the purpose of alignment in assembly. Member 4 fits into the well 7 of cup 8, the tongue 6 being accommodated by slot 9a formed in the inner surface of base 9. Cover plate 1, cylindrical member 4, and plastic cup 8 may be prefabricated from a thermoplastic resin, as for example, polystyrene.

In Figure 2 certain of the circuit components 10 are shown positioned in the cavities 5 and wired insofar as is possible at this point of assembly. Leads 11 of the components 10 are brought out at the bottom of member 4 through apertures 5a and threaded through adjacent similar apertures and connected to other components positioned in adjacent cavities. The opposite leads 11a of the components 10 are necked in recess 3 and brought through aperture 2 of the plastic cover plate. An opening 12 may be formed in the tongue 6 for the purpose of mounting member 4 on a suitable support to facilitate insertion of the components 10 in the cavities 5.

As shown in Figure 3 the components 10 are positioned in member 4 and the spaces around the components including the recess 3 are filled with packing material 19 such as polystyrene beads of suitable size, glass, wool or other suitable material or combinations of material to prevent movement or vibration of the components relative to member 4.

The assembly 18 shown in Figure 4 comprises assembled members 1, 4 and 8, components 10 and packing material or filler 19. The plastic cylindrical member 4 containing the packed components 10 is placed in the well 7 of cup 8 with tongue 6 in slot 9a and the cover plate 1 adjacent the recess 3. The assembly 18 is then placed in a mold 20 for curing as shown in Figure 5. The mold may be of any suitable type, that shown in Figure 5 being an example of one type. The mold has an inside diameter sufficient to loosely accommodate the assembly 18 of Figure 4. A base 13 positioned in the mold adjacent to its bottom supports the assembly therein. A plunger 14 having neat fit in the mold is positioned therein on top of the assembly and is formed with a tapered cavity 15 to accommodate the leads 11a of the components 10. The thermoplastic resin does not flow into recess 15 of the plunger 14 because the space between the wires and the plunger is sufficiently small and the combination of temperature and pressure sufficiently low to minimize creep. If any thermoplastic resin does flow into recess 15, it will be of such a minute quantity as to be substantially negligible and may easily be removed from the leads by a simple scraping operation. Though many temperature and pressure combinations are feasible, a suitable combination may be in the order of 300 p. s. i. pressure, and 325° F. temperature. The mold containing the assembly is then placed between a table 16 and press 17. While pressure is being applied to the assembly in the mold by means of press 17, the mold is undergoing an application of heat of a degree and duration as required by the dimension and materials comprising the assembly. The fit between the plunger and mold being such that the air from the compressed granular plastic in the assembly is vented therethrough, but at the same time not permitting access for the thermoplastic resin therethrough. After processing, as can be seen in Figure 6, the assembly now comprises a compact unitary member with the electrical components or the like firmly embedded therein.

This application is a continuation-in-part of application S. N. 300,134 filed July 21, 1952, now abandoned.

It will be apparent that the embodiment shown is only exemplary and that various modification can be made in construction and arrangement within the scope of the invention as defined in the appended claim.

I claim:

A method of enblocing electronic circuitry comprising the steps of forming a plastic cylindrical member with a recess in one end and spaced longitudinal perforations therein extending from the said recess to the opposite end of said cylindrical member, inserting components of said circuitry in each of said perforations with the terminals of said components extending exteriorly of the cylindrical member, appropriately connecting the terminals extending exteriorly of the said opposite end, necking the terminals extending exteriorly of the recess to forms spaced pins about the longitudinal axis of the cylindrical member, packing said perforations and recess with beads of plastic material, placing the packed cylindrical member in the well of a plastic cup, inserting a plastic closure member in the well atop of the cylindrical member to form an assembly, inserting said assembly in a mold and subjecting the assembly to controlled pressure and heat thereby producing a homogeneous plastic mass encasing said circuitry.

References Cited in the file of this patent

UNITED STATES PATENTS

| | | |
|---|---|---|
| 2,271,774 | Megow et al. | Feb. 3, 1942 |
| 2,753,533 | Houser | July 3, 1956 |